(12) United States Patent
Jones (10) Patent No.: US 10,870,240 B2
(45) Date of Patent: Dec. 22, 2020

(54) MOULDING MATERIAL FOR COMPOSITE PANELS

(71) Applicant: Gurit (UK) Ltd., Newport (GB)

(72) Inventor: Daniel Thomas Jones, Cowes (GB)

(73) Assignee: Gurit (UK) Ltd., Newport (GB)

( * ) Notice: Subject to any disclaimer, the term of this patent is extended or adjusted under 35 U.S.C. 154(b) by 534 days.

(21) Appl. No.: 15/556,493

(22) PCT Filed: Mar. 10, 2016

(86) PCT No.: PCT/EP2016/055164
§ 371 (c)(1),
(2) Date: Sep. 7, 2017

(87) PCT Pub. No.: WO2016/142479
PCT Pub. Date: Sep. 15, 2016

(65) Prior Publication Data
US 2018/0043637 A1   Feb. 15, 2018

(30) Foreign Application Priority Data

Mar. 10, 2015 (GB) .................................. 1504068.6

(51) Int. Cl.
*B29C 70/08* (2006.01)
*B32B 5/16* (2006.01)
(Continued)

(52) U.S. Cl.
CPC .......... *B29C 70/083* (2013.01); *B29C 70/081* (2013.01); *B29C 70/48* (2013.01);
(Continued)

(58) Field of Classification Search
None
See application file for complete search history.

(56) References Cited

U.S. PATENT DOCUMENTS

| 9,296,869 B2 * | 3/2016 | Ellis .......................... B32B 5/28 |
| 2004/0130067 A1 * | 7/2004 | Skinner ................. B29C 70/025 264/257 |

(Continued)

FOREIGN PATENT DOCUMENTS

| EP | 2862893 A1 | 4/2015 |
| GB | 2449146 A | 11/2008 |

(Continued)

OTHER PUBLICATIONS

Int'l. Preliminary Report on Patentability dated Sep. 12, 2017 in priority application PCT/EP2016/055164.
(Continued)

*Primary Examiner* — Matthew J Daniels
*Assistant Examiner* — Paul Spiel
(74) *Attorney, Agent, or Firm* — Polsinelli, PC (57) ABSTRACT

The present invention describes a prepreg for the manufacture of fibre reinforced resin matrix composite materials, the prepreg comprising: a surface film comprising a thermosetting resin and a particulate filler material dispersed therein, and a fibrous layer on which the surface film is disposed, the fibrous layer comprising a plurality of non-woven carbon fibres which are substantially randomly oriented, wherein the fibrous layer has interstices between the carbon fibres dimensioned for absorbing at least a portion of the thermosetting resin during a resin infusion step and filtering at least a portion of the particulate filler material in the surface film to remain in the surface film during the resin infusion step.

18 Claims, 6 Drawing Sheets

(51) Int. Cl.

| | | |
|---|---|---|
| B32B 5/26 | (2006.01) | |
| B32B 5/30 | (2006.01) | |
| B32B 27/12 | (2006.01) | |
| B32B 3/26 | (2006.01) | |
| B32B 5/02 | (2006.01) | |
| B32B 5/12 | (2006.01) | |
| B32B 7/08 | (2019.01) | |
| B32B 27/08 | (2006.01) | |
| B32B 27/20 | (2006.01) | |
| B32B 27/26 | (2006.01) | |
| B32B 27/38 | (2006.01) | |
| B32B 5/22 | (2006.01) | |
| B32B 27/06 | (2006.01) | |
| B32B 27/28 | (2006.01) | |
| B32B 3/00 | (2006.01) | |
| B32B 27/18 | (2006.01) | |
| B32B 7/02 | (2019.01) | |
| B32B 5/06 | (2006.01) | |
| B32B 7/00 | (2019.01) | |
| B32B 5/00 | (2006.01) | |
| B29C 70/48 | (2006.01) | |
| B29K 63/00 | (2006.01) | |
| B29K 105/08 | (2006.01) | |
| B29K 105/12 | (2006.01) | |
| B29K 307/04 | (2006.01) | |

(52) U.S. Cl.
CPC ............... *B32B 3/00* (2013.01); *B32B 3/26* (2013.01); *B32B 3/266* (2013.01); *B32B 5/00* (2013.01); *B32B 5/02* (2013.01); *B32B 5/022* (2013.01); *B32B 5/024* (2013.01); *B32B 5/06* (2013.01); *B32B 5/12* (2013.01); *B32B 5/16* (2013.01); *B32B 5/22* (2013.01); *B32B 5/26* (2013.01); *B32B 5/30* (2013.01); *B32B 7/00* (2013.01); *B32B 7/02* (2013.01); *B32B 7/08* (2013.01); *B32B 27/06* (2013.01); *B32B 27/08* (2013.01); *B32B 27/12* (2013.01); *B32B 27/18* (2013.01); *B32B 27/20* (2013.01); *B32B 27/26* (2013.01); *B32B 27/28* (2013.01); *B32B 27/38* (2013.01); *B29K 2063/00* (2013.01); *B29K 2105/0872* (2013.01); *B29K 2105/12* (2013.01); *B29K 2307/04* (2013.01); *B32B 2250/00* (2013.01); *B32B 2250/40* (2013.01); *B32B 2260/023* (2013.01); *B32B 2260/046* (2013.01); *B32B 2262/00* (2013.01); *B32B 2262/106* (2013.01); *B32B 2264/00* (2013.01); *B32B 2264/10* (2013.01); *B32B 2264/101* (2013.01); *B32B 2264/102* (2013.01); *B32B 2307/546* (2013.01); *B32B 2307/56* (2013.01); *B32B 2307/718* (2013.01); *B32B 2307/726* (2013.01); *B32B 2605/00* (2013.01); *B32B 2605/003* (2013.01); *B32B 2605/08* (2013.01)

(56) References Cited

U.S. PATENT DOCUMENTS

| | | | |
|---|---|---|---|
| 2008/0289743 A1* | 11/2008 | Tsotsis | B29B 11/16 156/93 |
| 2015/0336335 A1* | 11/2015 | Okawa | B32B 5/024 187/401 |
| 2016/0159998 A1* | 6/2016 | Spencer | B05D 1/12 156/286 |
| 2016/0318261 A1* | 11/2016 | Storer | B29C 70/34 |

FOREIGN PATENT DOCUMENTS

| | | |
|---|---|---|
| GB | 2516274 A | 1/2015 |
| WO | 0027632 A1 | 5/2000 |
| WO | 0228624 A1 | 4/2002 |
| WO | 2009092989 A1 | 7/2009 |
| WO | 2011122631 A1 | 6/2011 |
| WO | 2013178750 A1 | 12/2013 |
| WO | 2013178751 A1 | 12/2013 |
| WO | 2013178753 A1 | 12/2013 |
| WO | 2013178754 A1 | 12/2013 |
| WO | 2013178755 A1 | 12/2013 |
| WO | 2013178757 A1 | 12/2013 |
| WO | 2014184369 A1 | 11/2014 |
| WO | 2015007862 A1 | 1/2015 |

OTHER PUBLICATIONS

Int'l. Search Report and Written Opinion dated May 9, 2016 in priority application PCT/EP2016/055164.

Combined Search and Examination Report under Sections 17 and 18(3) dated Oct. 19, 2015 in priority application GB 1504068.6.

* cited by examiner

MOULDING MATERIAL FOR COMPOSITE PANELS

FIELD OF THE INVENTION

The present invention relates to a prepreg for the manufacture of fibre reinforced resin matrix composite materials. The present invention also relates to a method for preparing the fibre reinforced resin matrix composite material. In particular, the method of the present invention enables the manufacture of body panels, such as automotive body panels, comprising fibre reinforced resin matrix composite materials, where the body panels have a high quality surface finish.

BACKGROUND

In the field of automotive body panels, a significant weight saving can be achieved by replacing current metallic automotive body panels with composite materials. With lower cost tooling, significant savings can be made in lower volume production runs.

High performance body panel parts may be manufactured from preimpregnated materials (known as "prepreg") as described in EP 1 322 460 and EP 1 128 958, or from uni-directional prepreg layers. Plies of prepreg can be first assembled offline of the mould to form a preform or laid directly into the mould and cured. For higher production rates and lower cost, the prepreg can be compression moulded as described in EP 2 855 127, EP 2 855 123, EP 2 855 122, EP 2 855 126, EP 2 855 125, EP 2 855 128.

To reduce surface porosity and thereby improve the panel finish prior to painting, a variety of prepreg surface resin films are available in the market (see, for example, Gurit SF70, SF80, SF95PF and SF96, Cytec Surface Master 905 and FM02, GMS Composites E-272 and E-282, and TenCate Advanced Composites 8020 Surface Film). Typically, these resins are of a high viscosity so as to form a barrier of resin at the surface of the mould during the curing step. The resins usually contain a resin film, which is cast on to a consumable release film, and a lightweight carrier fabric. The lightweight carrier is typically applied dry to the cast resin film during manufacture, and is then either partially or fully impregnated during manufacture, or it becomes partially or fully impregnated on the roll when stored.

The carrier stabilises the resin film and allows the resin film to be cut and handled during part manufacture without excessive stretch or tear, and without poor release of the resin film from the consumable release film. The resins are usually a hot-melt blend of epoxy resins with optional fillers and flow control agents and a latent curing agent. B-Staged or hot-melt resin is preferred to solvent cast resins, as solvent cast resins can lead to entrapped solvent causing later paint defects in the surface layer.

In addition to reducing surface porosity, it is necessary to buffer further the paint from the underlying fibre layers in order to achieve a Class A automotive finish on a composite body panel. A repeating pattern from structural fabrics such as woven and multi-axial stitched products is easily noticeable in the final surface. Panels made from uni-directional prepreg can also produce print in the final painted surface especially if there are gaps or distortions in the fibre from drape forming the prepreg. The presence of resin rich zones in the fibre gaps can witness through to the surface with the difference in the fibre and resin modulus, thermal expansion and resin shrinkage during cure and then later through resin swelling and relaxation events over time and exposure to moisture. This problem is more pronounced in carbon composites where there is a higher differential in the fibre modulus and thermal expansion of the fibre than the resin.

To eliminate surface porosity, it is know that films weighing as low as 150 gsm can be sufficient and that the higher pressure of autoclave or compression moulding gives a reduced pin-hole surface than the lower pressure of vacuum consolidation using a flexible vacuum bag process. However, to mask the print surface from carbon prepreg layers, current surface films weighing 700 gsm are required as a barrier on the component A-surface to mask woven carbon and multi-axial laminates. One such example film is Gurit SF96 surface film available as SA11-4417 SF96/S/700/1260 mm, which is a 700 gsm epoxy prepreg film with a 70 gsm glass carrier. This epoxy prepreg film has a total areal weight of 770 gsm, and is curable from 90° C. A similar product with the same areal weight is also sold as 8020 Surface Film by Tencate Advanced Composites. Thus, such films add undesirable weight to the composite.

When making a thin laminate, such as a car body panel, the surface layer causes the panel to twist after the de-moulding stage due to the difference in thermal expansion of the surface layer compared to the laminate. To reduce the resin shrinkage, thermal expansion, and to make the surface easier to sand to prepare for painting, the Gurit SA11-4417 SF96/S/700/1260 mm resin contains a total of 35-40% talc and calcium carbonate fillers by weight, which equates to 20 to 24% by volume.

To eliminate this problem, a symmetrical laminate can be made by repeating the surface layer at the B-surface of the part. However, the inclusion of the surface layer on the B-surface adds further weight. An alternative (for example, Gurit CBS®) is to use a high resin content glass prepreg on the B-Surface to balance out the expansion and shrinkage of the surfacing resin. An example of a high resin content glass prepreg is Gurit prepreg SA11-4800 ST86HT/RE400T/289 gm/S/S, which is a 400 gsm woven glass epoxy prepreg having a resin content of 42% by weight. However, both of the above-mentioned options add weight and cost to the carbon laminate.

It is accordingly an aim of this invention to provide a prepreg surfacing material that gives a lower cost and lower weight laminate, and overcome at least some of these significant disadvantages.

SUMMARY OF THE INVENTION

The present invention provides a prepreg for the manufacture of fibre reinforced resin matrix composite materials, the prepreg comprising a surface film comprising a thermosetting resin and a particulate filler material dispersed therein, and a fibrous layer on which the surface film is disposed, the fibrous layer comprising a plurality of non-woven carbon fibres which are substantially randomly oriented, wherein the fibrous layer has interstices between the carbon fibres dimensioned for absorbing at least a portion of the thermosetting resin during a resin infusion step and filtering at least a portion of the particulate filler material in the surface film to remain in the surface film during the resin infusion step.

The prepreg provides the advantage in that it provides a high quality surface finish by forming a thinner final cured surface resin layer and providing structural stiffness and strength to the laminate. As such, lighter and lower cost symmetrical carbon laminates can be formed that do not respond asymmetrically to applied thermal or mechanical loads, and require reduced preparation for painting to an A-class finish.

The present invention further provides a method for preparing a fibre reinforced resin matrix composite material, the method comprising the steps of: (i) providing a prepreg comprising a surface film comprising a thermosetting resin and a particulate filler material dispersed therein, and a fibrous layer on which the surface film is disposed, the fibrous layer comprising a plurality of non-woven carbon fibres which are substantially randomly oriented, wherein the fibrous layer has interstices between the carbon fibres dimensioned for absorbing at least a portion of the thermosetting resin during a resin infusion step and filtering at least a portion of the particulate filler material in the surface film to remain in the surface film during the resin infusion step; (ii) providing a mould; (iii) loading the prepreg into a cavity of the mould such that the surface film is located toward a moulding surface of the mould; and (iv) subjecting the prepreg to a moulding step, the moulding step comprising applying a vacuum to the cavity of the mould and applying a closure load to the mould to generate a pressure in the cavity of the mould to cause at least a portion of the thermosetting resin to infuse into the fibrous layer to impregnate the carbon fibres and to filter at least a portion of the particulate filler material in the surface film to remain in the surface film.

The present invention further provides a method for preparing a fibre reinforced resin matrix composite material, the method comprising the steps of: (i) providing a prepreg according to any one of claims 1-33; (ii) providing a heated premould; (iii) loading the prepreg into the premould; (iv) optionally subjecting the prepreg to a temperature of from 0 to 150° C. and/or a pressure of from 0.01 to 10 bar so as to increase the rigidity in the layers of the prepreg and form a preform; (v) providing a mould; (vi) loading the preform into a cavity of the mould such that the surface film is located toward a moulding surface of the mould; and (vii) subjecting the preform to a moulding step, the moulding step comprising applying a vacuum to the cavity of the mould and applying a closure load to the mould to generate a pressure in the cavity of the mould to cause at least a portion of the thermosetting resin to infuse into the fibrous layer to impregnate the carbon fibres and to filter at least a portion of the particulate filler material in the surface film to remain in the surface film.

These methods enable a cost effective light weight composite material to be formed that do not respond asymmetrically to applied thermal or mechanical loads, and require reduced preparation for painting to an A-class finish.

The present invention further provides a fibre reinforced resin matrix composite material comprising a surface film comprising a cured thermosetting resin and a particulate filler material dispersed therein, wherein the surface film has a thickness of at least 100 microns and the particulate filler material comprises at least 2 vol % of the surface film, and a fibrous layer on which the surface film is disposed, the fibrous layer comprising a plurality of non-woven carbon fibres which are substantially randomly oriented, wherein the fibrous layer has interstices filled with the cured thermosetting resin and a thickness of at least 200 microns.

The composite material provides a high quality surface finish by forming a thinner final cured surface resin layer with a higher solids content which imparts less shrinkage and distortion into the subsequent panel. The particulate filler is filtered and reduces the resin rich zones at the surface of material formed by fibre cross-overs and any needling voids created in stabilising the non-woven material into a handable product.

The present invention further provides a vehicle body panel comprising the composite material of the present invention. The vehicle body panel has excellent surface finish, stiffness and strength to weight ratios. The panels require less preparation for painting to an A-class finish.

Preferred features of the present invention are defined in the respective dependent claims.

As used throughout, by average particle size, it is meant that the mean size as measured using a particle size analyser.

By substantially randomly orientated, it is meant the regular repeating fibre angles are not noticeable as in the case of a unidirectional, woven, or multiaxial fabric.

Particle size distributions were measured using a Malvern 3801 Mastersizer particle size analyser.

By mid-plane, it is meant the middle of the prepreg/preform/composite material such that the layers either side of the mid-plane are a mirror image of each another. The mid-plane may be defined as the neutral axis.

By A-surface, it is meant the final intended visible cosmetic surface, for example the exterior surface of an automotive hood, or in the case of an separately moulded inner stiffener bonded to that hood the surface seen when the hood is opened to inspect the engine compartment.

By B-surface, it is meant the usual surface hidden from view or the surface viewed as not having the same cosmetic finish standard if both surfaces are to be seen.

BRIEF DESCRIPTION OF THE DRAWINGS

Embodiments of the present invention will now be described by way of example, with reference to the accompanying drawings, in which.

DETAILED DESCRIPTION

Figure 1:
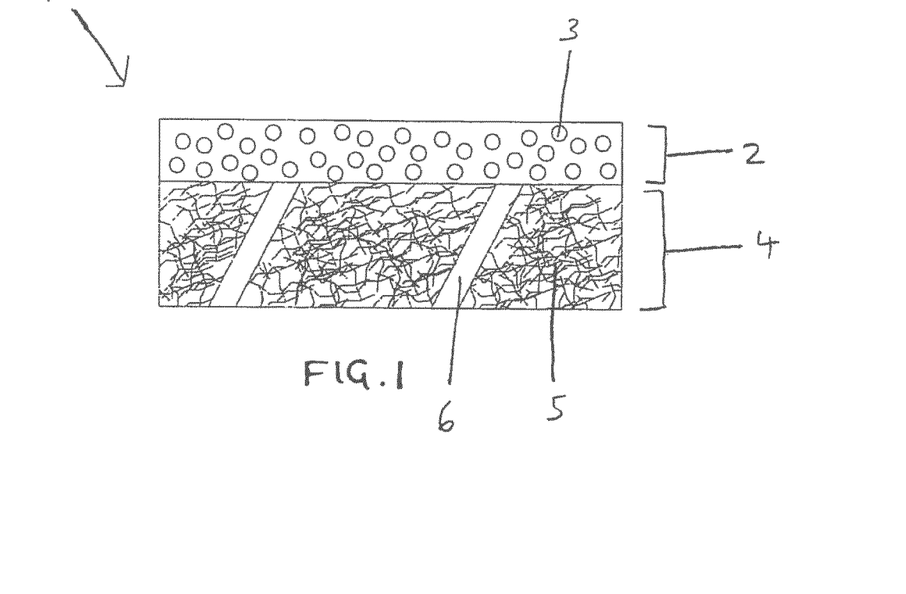
FIG. 1 schematically illustrates a prepreg according to an embodiment of the present invention.

Referring to FIG. 1, there is shown in schematic form a prepreg 1 according to an aspect of the present invention. As described hereinafter, the prepreg is utilised to manufacture a fibre reinforced resin matrix composite material, which can be subsequently processed into a vehicle body panel.

The prepreg 1 comprises a surface film 2 which comprises a thermosetting resin and particulate filler 3 material dispersed therein.

The surface film may have a thickness of from 150 to 600 microns. Optionally, the surface film has a thickness of from 200 to 500 microns. Typically, the surface film has a weight of from 200 to 900 grams per square metre. Optionally, the weight of the surface film is from 300 to 700 grams per square metre, further optionally 400 to 600 grams per square metre.

Dispersed in the surface film is a particulate filer material. The surface film typically has a particulate filler material concentration of from 2 to 40 vol %, based on the volume of the surface film. Optionally, surface film has a particulate filler material concentration of from 2 to 20 vol %, based on the volume of the surface film.

The particulate filler material typically comprises and inorganic material. For example, the particulate filler material may comprises Talc, calcium carbonate, silica, aluminosilicate ash, chalk, clay minerals, marble dust, slate powder or silicon carbide. Optionally, the particulate filler may comprise Talc. Optionally, the particulate filler is Talc. Further optionally, the particulate filler is Magil Star 350# talc. The particulate filler material may have a weight of from 80 to 400 grams per square metre, and/or an average particle size of from 5 to 30 microns. Optionally, the average particle size of the particulate filler material is from 8 to 20 microns, for example about 12 microns.

Typically, at least 98 wt % of the particulate filler material passes through a 45 micron sieve. Optionally, the particulate filler material has a particle size distribution of 99 wt % less than 75 microns, 84 wt % less than 30 microns, 68 wt % less than 20 microns and 48 wt % less than 10 microns.

The surface film also comprises a thermosetting resin, which may comprise an epoxy, vinyl ester, polyester, acrylic, cyanate ester, phenolic, furan, or benzoxazine resin. Typically, the thermosetting resin comprises an epoxy resin. Optionally, the thermosetting resin is epoxy, vinyl ester, polyester, acrylic, cyanate ester, phenolic, furan, or benzoxazine resin. Further optionally, the thermosetting resin is an epoxy resin.

The surface film is disposed on the fibrous layer 4. The fibrous layer comprises a plurality of non-woven carbon fibres 5, which are substantially randomly orientated. This is preferred over a powder bound chop strand matt, which has a coarse distribution of fibres. The fibrous layer has interstices between the carbon fibres dimensioned for absorbing at least a portion of the thermosetting resin during a resin infusion step and filtering at least a portion of the particulate filler material in the surface film to remain in the surface film during the resin infusion step.

Typically, the fibrous layer may have interstices between the carbon fibres dimensioned for absorbing at least 25 vol % of the thermosetting resin during a resin infusion step and filtering at least 2 vol %, optionally at least 5 vol %, further optionally at least 10 vol %, of the particulate filler material in the surface film to remain in the surface film during the resin infusion step.

The non-woven carbon fibres may be chopped and/or cut fibres. Thus, the fibrous layer may comprise chopped and/or cut fibres. Such chopped and/or cut carbon fibres may have a length of less than 250 mm. Optionally, at least 50 wt % of the fibres have a length of from 10 to 150 mm, optionally from 10 to 50 mm and further optionally from 10 to 30 mm.

The carbon fibres may be recycled carbon fibres (recycled fibre sources), for example from ELG Carbon Fibre Ltd, SGL Group, and Formax. The advantage of recycled carbon fibres is that the cost and carbon footprint of the method used to manufacture the fibrous layer is reduced. The fibrous layer may be formed as a batt, optionally where the batt is formed of single or multiple fibre layers.

The fibrous layer may be manufactured by a carding process. Following the carding process, a multiply-layered substantially randomly oriented fibre matt may be formed by a needling process to entangle the fibrous layers and enable it to be subsequently wound and handled in a roll format. Thus, the fibrous layer may comprise sub-layers, the sub-layers being optionally interconnected by needling. Stitching of the matt induces print marks into the final surface and a greater surface resin layer is needed to mask the stitching marks and is not preferred. The fibrous layer may therefore optionally comprise needle holes 6, which are formed during the needling. A needling process provides stabilisation but usually induces resin rich zones in cured parts made from alternative processes to this invention. Resin rich zones can also form at the fibre cross overs on the part surface. In contrast to other manufacturing process such as VARTM, RTM and RTM light, which use low viscosity liquid resin by combining the particulate filled surface resin these resin rich zones in the fibrous layer are filled with a high concentration of particulate which prevents a later read-through of needle and fibre marks into the final painted surface.

The thickness of the fibrous layer may be from 500 microns to 10 mm. Optionally, the thickness of the fibrous layer is from 1 mm to 7.5 mm, for example 4 mm. The fibrous layer may also have a weight of greater than 100 grams per square metre, optionally from 100 to 300 grams per square metre and further optionally from 150 to 250 grams per square metre.

The fibrous layer typically has a loft such that the fibrous layer is compressed in thickness by at least 30%, typically at least 45%, more typically at least 50% of the uncompressed thickness when subjected to a compressive load of 1 bar at 18-23° C.

Figure 3:
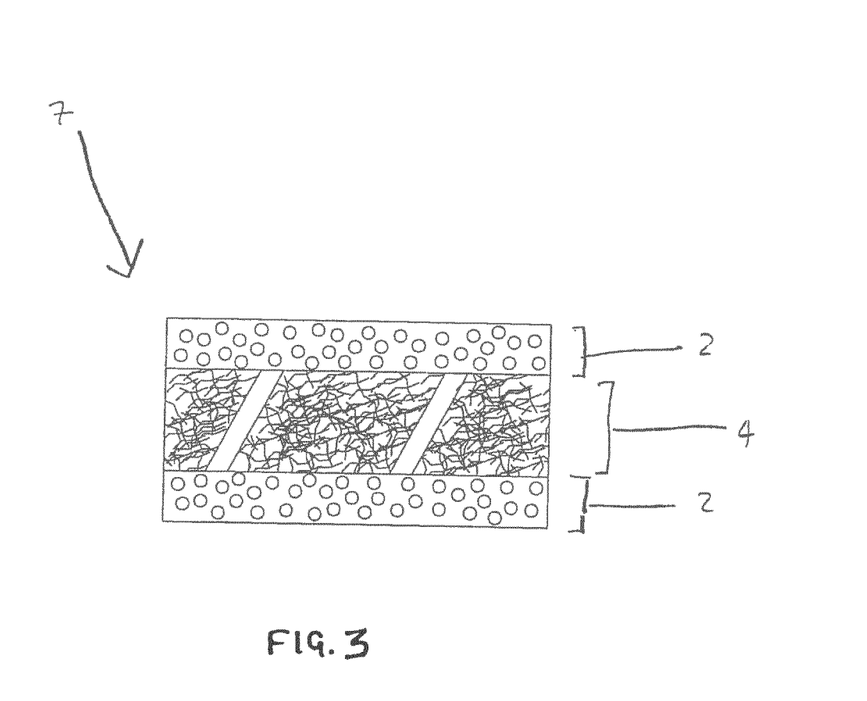
FIG. 3 schematically illustrates a multilayer prepreg according to another embodiment of the present invention.

As shown in FIG. 3, the prepreg may comprise more than one of the surface films 2, typically two surface films, and at least one, typically one, of the fibrous layers 4 to form a multilayer prepreg 7. In the multilayer prepreg, the at least one fibrous layer is sandwiched between opposing surface films. Optionally, the more than one surface films and the at least one fibrous layer are present such that the prepreg layers are symmetrical with respect to a mid-plane of the prepreg, as shown in FIG. 3. In this format the material forms a ready to use moulding material that will not warp or twist when demoulded or given a subsequent thermal or mechanical load. The material gives a paintable finish on both the A- and B-surfaces.

Figure 5:
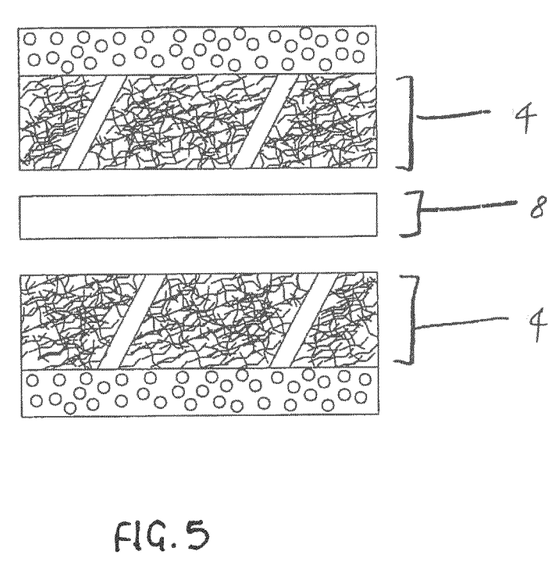
FIG. 5 schematically illustrates a prepreg comprising an additional layer sandwiched between two opposing fibrous layers according to another embodiment of the present invention.

As shown in FIG. 5, the prepreg may also comprise at least two, typically two, of the fibrous layers 4 and at least one additional layer 8 sandwiched between opposing fibrous layers.

The additional layer may be a fabric ply, the fabric ply typically comprising carbon fibres. Optionally, the fabric ply is multiaxial, woven or non-woven.

Figure 6:
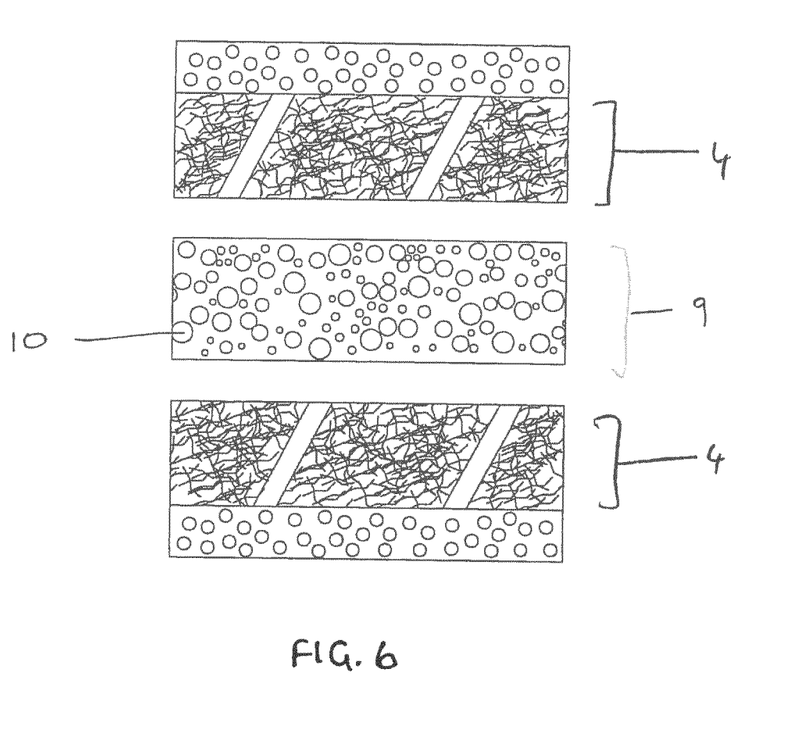
FIG. 6 schematically illustrates a prepreg comprising a syntactic layer sandwiched between two opposing fibrous layers according to another embodiment of the present invention.

Alternatively, the additional layer may comprise a syntactic layer 9, as shown in FIG. 6. The syntactic layer typically comprises a resin and hollow microspheres 10 dispersed therein. Optionally, the syntactic layer comprises flow control agents dispersed therein.

Alternatively, the additional layer may comprise a resin, optionally wherein the additional layer is a resin layer. The resin may optionally comprises a particulate filler material, the particulate filler material typically comprising the same fillers that are in the surface resin or additional fillers designed to impart further strength, stiffness, toughness, and stiffness such as milled carbon fibre, wollstinate, impact modifiers, rubbers and thermoplastic particles that could migrate into the space not filled by the longer fibres of the fibrous layer or form interleave or phase toughened layers.

Figure 8:
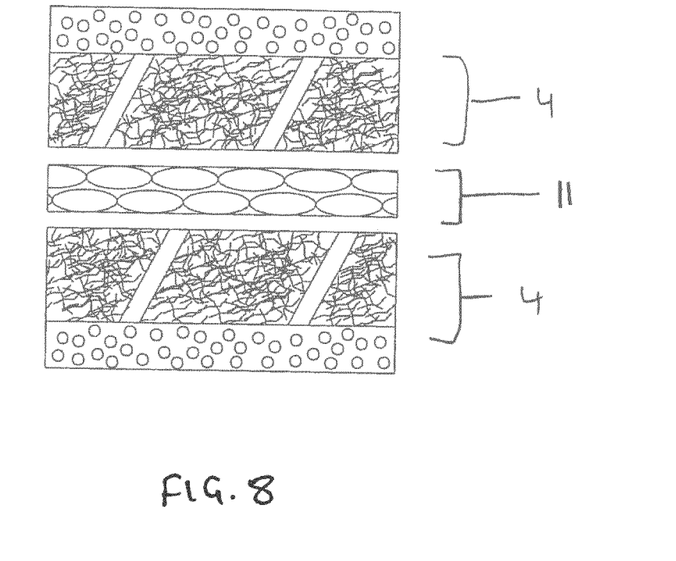
FIG. 8 schematically illustrates a prepreg comprising a layer comprising unidirectional prepregs sandwiched between two opposing fibrous layers according to another embodiment of the present invention.

Optionally, the additional layer comprises one or more unidirectional prepregs 11, as shown in FIG. 8. The one or more unidirectional prepregs each comprise fibres aligned unidirectionally. The unidirectional prepregs may be used to provide strength, optionally to provide strength to the prepreg in a single direction.

Typically, the additional layer comprises more than one unidirectional prepreg. Each of the more than one unidirectional prepregs comprise fibres aligned unidirectionally. The fibres in each of the more than one unidirectional prepregs may be aligned in a direction so as to provide greater stiffness and strength to the laminate. Optionally, the direction of the fibres in each of the more than one unidirectional prepregs are staggered with respect to each other. Thus, the fibre alignment of the more than one prepreg may be staggered with respect to each other. To avoid unwanted tension shear-coupling, a multi-axial, cross ply or quasi-isotropic laminate could be formed using plies of unidirectional prepreg, each comprising unidirectional fibres which are aligned at different fibre angles relative to each other.

Typically, the additional layer is positioned in the multi-layer prepreg as a central layer such that the combined prepreg layers are symmetrical about the central layer. This avoids unwanted warp or twist responses to thermal or mechanical loads. Such a feature can been seen in the prepregs of FIGS. 5, 6 and 8.

The prepreg of the present invention may be shaped to form a preform. Optionally, the prepreg is subjected to a temperature of from 0 to 150° C. and/or a pressure of from 0.01 to 10 bar to form the preform, further optionally wherein the preform is subsequently cooled.

Optionally, the prepreg is tacked together to form the preform.

Optionally the preform may be partially, fully impregnated, or cooled prior to loading into the mould tool to make the preform more rigid. An advantage of providing a preform prior to the moulding step described hereinbelow instead of laying the prepreg directly into the mould is that the preform can be shaped to the correct size and form is more rigid, can be easily handled into the tool. Thus, the correct resin and fibre ratio and shape can be prepared offline from the main tool.

Another aspect of the present invention is a method for preparing a fibre reinforced resin matrix composite material from the prepregs of the present invention.

In a first step of the method a prepreg is provided, where the prepreg comprises a surface film comprising a thermosetting resin and a particulate filler material dispersed therein. The surface film is disposed on a fibrous layer. The fibrous layer comprises a plurality of non-woven carbon fibres which are substantially randomly oriented. The fibrous layer also has interstices between the carbon fibres.

The prepreg may be any prepreg as described herein. That is, the surface film, thermosetting resin, particulate filler material and fibrous layer may contain any of the characteristics as described herein in relation to the prepreg of the present invention.

In a second step of the method, a mould is provided. The prepreg is then loaded into a cavity of the mould in a third step such that the surface film of the prepreg is located toward a moulding surface of the mould. Typically, the prepreg is loaded into a cavity of the mould such that the surface film is located against a moulding surface of the mould.

In a fourth step, the prepreg is subjected to a moulding step, for example compression moulding or autoclave moulding, so as to cure the prepreg. Optionally, the moulding step is compression moulding. During the moulding step, a vacuum is applied to the cavity of the mould and then a closure load is applied to the mould to generate a pressure in the cavity of the mould. This causes at least a portion of the thermosetting resin to infuse into the fibrous layer to fully or partially impregnate the carbon fibres and to filter at least a portion of the particulate filler material in the surface film to remain in the surface film. The moulding step may be conducted at a pressure from 6 to 100 bar, typically from 6-50 bar. The moulding step may optionally be conducted at a temperature of from 80-250° C., typically at a temperature of from 120-220° C.

The interstices in the fibrous layer are dimensioned for absorbing at least a portion of the thermosetting resin during the resin infusion step (i.e. the moulding step). Optionally, during the moulding step the fibrous layer absorbs at least 25 vol % of the thermosetting resin. During the moulding step, the fibrous layer is dimensioned so as to filter at least a portion of the particulate filler material in the surface film to remain in the surface film. Typically, the fibrous layer filters at least 2 vol %, optionally at least 5 vol %, further optionally at least 10 vol %, of the particulate filler material in the surface film to remain in the surface film.

Thus, during the moulding step, at least a portion of thermosetting resin infuses into the fibrous material from the surface film, resulting in full or partial impregnation of the carbon fibres. Typically, the carbon fibres are fully impregnated by the thermosetting resin.

The fibrous layer in the prepreg may also comprise needle holes. When such needle holes are present, the needle holes are at least partially filled with the filler material during the moulding step. Without the particulate filler the surface would be of insufficient quality as the needle holes would read through into the final painted surface.

During the moulding step the fibrous layer may have a high loft such that when the fibrous layer is a subjected to a compressive load of 1 bar at 18-23° C., the thickness of the fibrous layer is reduced by at least 30%, optionally at least 45%, further optionally at least 50%.

As the fibrous layer has high loft it absorbs a significant volume of the thermosetting resin during the moulding step. The fibrous layer acts as an effective filter to concentrate the particulate filler particles within the thermosetting resin to form a high solids consistent resin layer between the fibrous layer and the A-Surface. By providing the prepreg of the present invention with a surface layer comprising a thermosetting resin and particulate filler, it is possible to achieve an A-class finish at lower areal weights than has been achieved before. The prepreg of the present invention overcomes defects seen when such materials have been used in other manufacturing processes to make composite parts. For example, recycled and non-recycled carbon fibres of this form have been used in RTM resin injection processes to make carbon fibre parts. However, defects in the surface are evident from the needling process, which produces holes within the fibrous layer and localised resin and fibre rich zones at the surface and which show through to the painted finish.

The surface film in the prepreg, i.e. prior to the moulding step, typically has a thickness of from 150-600 microns and a particulate filler concentration of from 2 to 40 vol %. After the moulding step, the surface film of the fibre reinforced resin matrix composite material has a thickness of from 25-400 microns and a filler concentration of from 10 to 70 vol %.

Optionally, the prepreg in the first step of the method described hereinabove comprises a plurality of the surface films, typically two surface films, and at least one of the fibrous layer, typically one fibrous layer, to form a multilayer prepreg, where the at least one fibrous layer is sandwiched between opposing surface films. Typically, the more than one surface films and the at least one fibrous layer in such a prepreg are present such that the prepreg layers are symmetrical with respect to a mid-plane of the prepreg. When such a prepreg is used in the method described hereinabove, at least a portion of the thermosetting resin from each of the opposing surface films infuses, i.e. migrates, into the at least one (sandwiched) fibrous layer to fully or partially impregnate the carbon fibres during the moulding step. This material format is suitable for moulding of thinner panels as a single moulding material or allowing fewer plies containing thicker fibrous layers to be used as each resin can impregnate a proportion of the fibrous layer.

Further optionally, the prepreg in the first step of the method may comprise at least two of the fibrous layers, typically two, and further comprises at least one additional layer sandwiched between opposing fibrous layers. The additional layer may be a fabric ply, the fabric ply typically comprising carbon fibres. Optionally, the fabric ply is multiaxial, woven or non-woven.

Alternatively, the additional layer may comprise a syntactic layer. The syntactic layer typically comprises a resin and hollow microspheres dispersed therein. During the curing step, at least a portion of such a resin in the syntactic layer infuses into each of the fibrous layers to fully or partially impregnate the carbon fibres. Thus, this results in a decrease in the density of the syntactic layer, and therefore a decrease in weight of the resultant composite material Alternatively, the additional layer may comprises a resin, optionally wherein the additional layer is a resin layer. The resin may optionally comprises a particulate filler material, the particulate filler material typically comprising the same fillers that are in the surface resin or additional fillers designed to impart further strength, stiffness, toughness, and stiffness such as milled carbon fibre, wollstinate, impact modifiers, rubbers and thermoplastic particles that could migrate into the space not filled by the longer fibres of the fibrous layer or form interleave or phase toughened layers.

Optionally, the additional layer comprises one or more unidirectional prepregs. The one or more unidirectional prepregs each comprise fibres aligned unidirectionally. The unidirectional prepregs may be used to provide strength, optionally to provide strength to the prepreg in a single direction.

Typically, the additional layer comprises more than one unidirectional prepreg. Each of the more than one unidirectional prepregs comprise fibres aligned unidirectionally. The fibres in each of the more than one unidirectional prepregs may be aligned in a direction so as to provide greater stiffness and strength to the laminate. Optionally, the direction of the fibres in each of the more than one unidirectional prepregs are staggered with respect to each other. Thus, the fibre alignment of the more than one prepreg may be staggered with respect to each other. To avoid unwanted tension shear-coupling, a multi-axial, cross ply or quasi-isotropic laminate could be formed using plies of unidirectional prepreg, each comprising unidirectional fibres which are aligned at different fibre angles relative to each other.

Typically, the additional layer is a central layer of the prepreg, such that the prepreg layers are symmetrical about the central layer/mid-plane of the prepreg. Thus, the resulting composite material is also typically symmetrical about the central layer/mid-plane of the composite material.

In another aspect of the present invention, a method for preparing a fibre reinforced resin matrix composite material is described, where the method comprising the following steps.

In a first step, a prepreg according to the present invention is provided. The second and third steps involve providing a heated premould and loading the prepreg into the premould. In a fourth step, the prepreg is optionally subjected to a temperature of from 0 to 150° C. and/or a pressure of from 0.01 to 10 bar so as to increase the rigidity of the prepreg layers and form a preform.

The advantage of forming a preform from the prepreg prior to the moulding step is that the preforms are more rigid, can be cut easily and are easier to transfer.

Subsequently, in fifth and sixth steps, a mould is provided and the preform formed in step (iv) is loaded into a cavity of the mould such that the surface film is located toward a moulding surface of the mould. Typically, the surface film is located against the moulding surface of the mould. Finally, in the seventh step, the preform is subjected to a moulding step, for example compression moulding or autoclave moulding. Optionally, the moulding step is compression moulding. During the moulding step, a vacuum is applied to the cavity of the mould and then a closure load is applied to the mould to generate a pressure in the cavity of the mould. This causes at least a portion of the thermosetting resin to infuse, i.e. migrate, into the fibrous layer to fully or partially impregnate the carbon fibres. At the same time, at least a portion of the particulate filler is material is filtered in the surface film to remain in the surface film. The moulding step may be conducted at a pressure of from 6 to 100 bar, typically from 6-50 bar. The moulding step may optionally be conducted at a temperature of from 80-250° C., typically at a temperature of from 120-220° C.

When a prepreg according to the present invention formed into a preform to load into the mould, the loft of the non-woven fibrous layer is such that a significant volume fraction of void space remains in the unimpregnated fibrous layer during the loading and pre-closing step of the mould. The void passages are maintained even when the thermosetting resin begins to warm and soften during the fourth step. The void passages provide an air escape route that allows any entrapped air with the preform to escape from the preform during a vacuum hold stage, which occurs before the moulding step. Materials having less loft and which are easily impregnated do not provide such efficient degassing of air channels within the ply stack.

The material eliminates the previous problems seen when using the lower tool to form the part A-surface.

Figure 2:
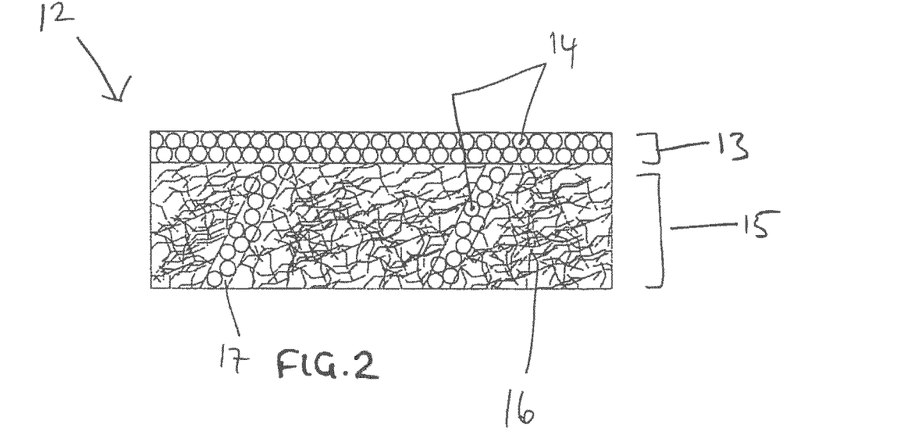
FIG. 2 schematically illustrates a composite material according to an embodiment of the present invention.

Another aspect of the present invention is a fibre reinforced resin matrix composite material. Referring to FIG. 2, there is shown in schematic form the fibre reinforced resin matrix composite material 12. The fibre reinforced resin matrix composite material may be formed from the prepreg of the present invention using the methods described hereinabove.

The fibre reinforced resin matrix composite material comprises a surface film 13. The surface film comprises a cured thermosetting resin and a particulate filler material 14 dispersed therein.

The surface film has a thickness of at least 100 microns. Optionally, the surface film has a thickness of from 100 to 600 microns, and/or a weight of from 200 to 900 grams per square metre.

The particulate filler material is dispersed in the surface film. The particulate filler material comprises at least 2 vol % of the surface film, i.e. 2 vol % of the surface film is the particulate filler material. Optionally, the particulate filler material comprises at least 5 vol % of the surface film, i.e. 5 vol % of the surface film is the particulate filler material. Further optionally, the particulate filler material comprises at least 10 vol % of the surface film, i.e. 10 vol % of the surface film is the particulate filler material. The particulate filler material may comprise an inorganic material, for example, Talc, calcium carbonate, silica, alumino-silicate ash, chalk, clay minerals, marble dust, slate powder or silicon carbide. Optionally, the particulate filler comprises Talc. Optionally, the particulate filler is Talc. Further optionally, the particulate filler is Magil Star 350# talc.

The particulate filler material may optionally have a weight of from 40 to 400 grams per square metre, and/or an average particle size of from 5 to 30 microns, optionally from 8 to 20 microns, for example about 12 microns.

Typically, at least 98 wt % of the particulate filler material passes through a 45 micron sieve. Optionally, the particulate filler material has a particle size distribution of 99 wt % less than 75 microns, 84 wt % less than 30 microns, 68 wt % less than 20 microns and 48 wt % less than 10 microns.

The surface film also comprises a cured thermosetting resin, typically comprising a cured epoxy, vinyl ester, polyester, acrylic, cyanate ester, phenolic, furan, or benzoxazine resin. Optionally, the cured thermosetting resin is a cured epoxy resin. Typically, the cured thermosetting resin comprises a cured epoxy resin. Optionally, the cured thermosetting resin is a cured epoxy, vinyl ester, polyester, acrylic, cyanate ester, phenolic, furan, or benzoxazine resin. Further optionally, the cured thermosetting resin is a cured epoxy resin.

The surface film of the composite material is disposed on the fibrous layer 15. The fibrous layer has a thickness of at least 200 microns, optionally 500 microns to 7 mm. The fibrous layer may have a weight of greater than 100 grams per square metre.

The fibrous layer comprises a plurality of non-woven carbon fibres 16, which are substantially randomly oriented. This is preferred over a powder bound chop strand matt, which has a coarse distribution of fibres. The fibrous layer has interstices filled with the cured thermosetting resin. Thus, the fibrous layer has interstices between the carbon fibres in which a portion of the thermosetting resin is present.

Typically, at least 50 wt % of the fibres having a length of from 10 to 150 mm. Optionally, at least 50 wt % of the fibres have a length of from 10 to 50 mm, further optionally from 10 to 30 mm. The non-woven carbon fibre may be chopped and/or cut fibres. The chopped and/or cut carbon fibres may have a length of less than 250 mm.

The carbon fibres may be recycled carbon fibres (recycled fibre sources). The advantage of recycled carbon fibres is that the cost and carbon footprint of the method used to manufacture the fibrous layer is reduced.

On curing to form the composite material, the interstices between the carbon fibres in the fibrous layer are filled with at least a portion of the thermosetting resin. In addition, if the fibrous layer comprises needle holes 17 from needling, such needle holes at least partially filled with the filler material. Thus, the fibrous layer of the composite material may comprise needle holes which are at least partially filled with the filler material.

Figure 4:
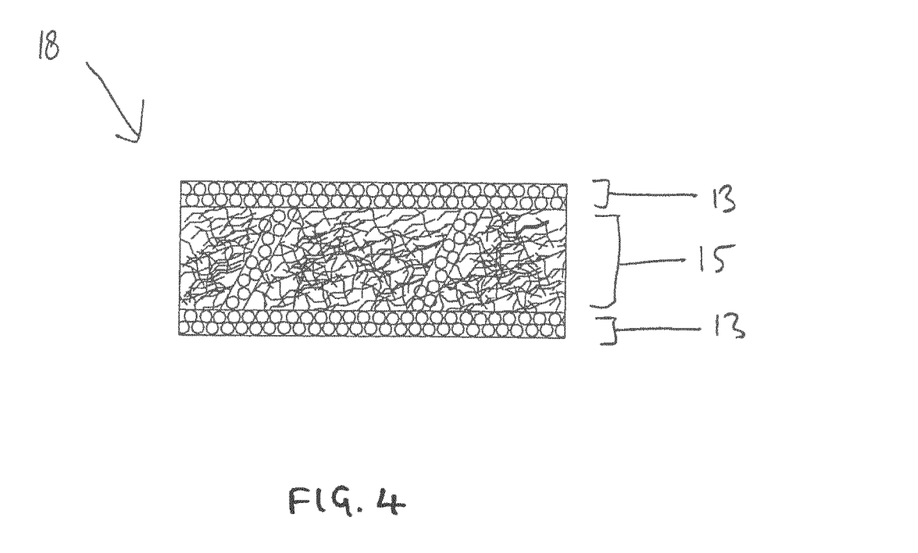
FIG. 4 schematically illustrates a composite material comprising two surface films according to another embodiment of the present invention.

The composite material may optionally comprise more than one (i.e. a plurality) of the surface films (each of which comprises a cured thermosetting resin and a particulate filler dispersed therein) and at least one of the fibrous layers to form a multilayer composite material 18, as shown in FIG. 4. In such a multilayer composite material, the at least one fibrous layer 15 is sandwiched between opposing surface films 13. Optionally, the plurality of surface films and the at least one fibrous layer are present such that the composite material layers are symmetrical with respect to a mid-plane of the composite material.

The composite material may also comprise at least two of the fibrous layers and at least one additional layer sandwiched between opposing fibrous layers. The additional layer may be a fabric ply, the fabric ply typically comprising carbon fibres. Optionally, the fabric ply is multiaxial, woven or non-woven.

Figure 7:
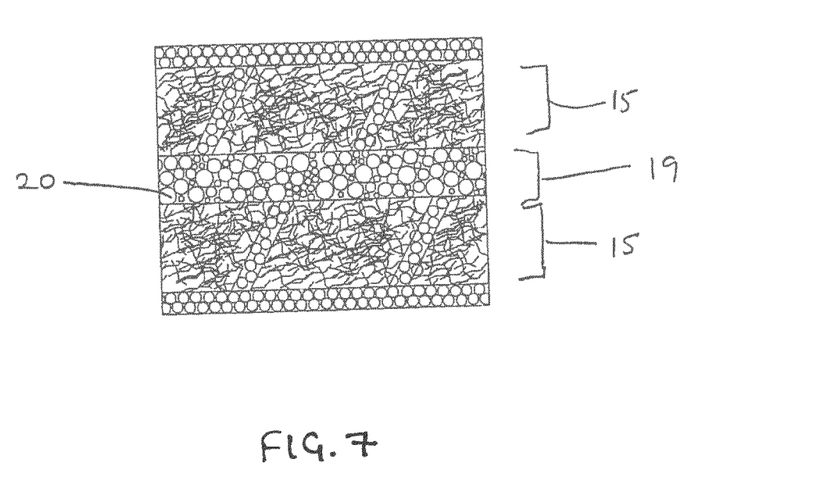
FIG. 7 schematically illustrates a composite material comprising a syntactic layer sandwiched between two opposing fibrous layers according to another embodiment of the present invention.

Alternatively, the additional layer may comprise a syntactic layer 19, as shown in FIG. 7. The syntactic layer typically comprises hollow microspheres 20 dispersed therein. Optionally, the syntactic layer comprises flow control agents dispersed therein. On curing, some, i.e. at least a portion, of the resin in the syntactic layer infuses from the syntactic layer into the fibrous layers. In this instance, the fibrous layer acts as an effective filter to keep the microspheres from migrating through the laminate stack. Thus, the syntactic layer of the composite material consists of a core containing a higher final volume fraction of hollow microspheres, which reduces the density of the syntactic layer.

Thus, a composite material can be made that is lighter, stronger and stiffer construction. The syntactic layer can also compensate for changes in the moulding cross section and flow to fill the different thickness. This is highly useful for avoiding a significant skin thickness change that may induce surface print. The syntactic can also help self-compensate for any changes in areal weight in the fibrous layers by that would have caused a local hard pressure intensity spot when attempting to compress to a high volume fractions and mark the final painted surface by flowing to fill the lower fibre weight areas and allowing high resin pressure to be maintained for high volume fraction without local crushing of the high fibre gsm zones.

Alternatively, the additional layer may comprises a resin, optionally wherein the additional layer is a resin layer. The resin may optionally comprises a particulate filler material, the particulate filler material typically comprising the same fillers that are in the surface resin or additional fillers designed to impart further strength, stiffness, toughness, and stiffness such as milled carbon fibre, wollstinate, impact modifiers, rubbers and thermoplastic particles that could migrate into the space not filled by the longer fibres of the fibrous layer or form interleave or phase toughened layers.

Figure 9:
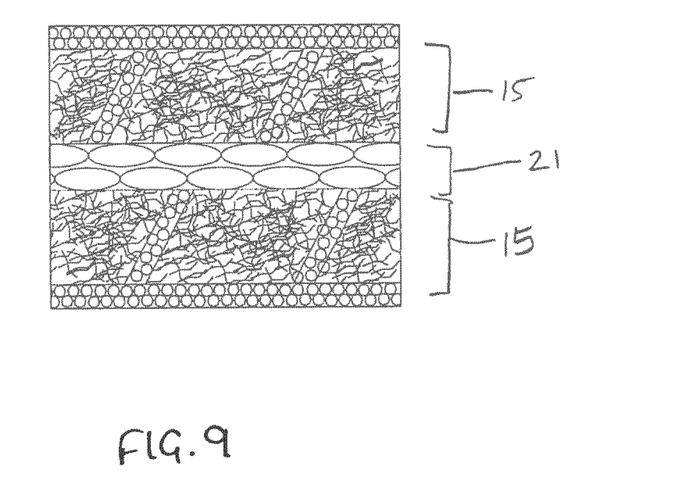
FIG. 9 schematically illustrates a composite material comprising a unidirectional prepreg layer sandwiched between two opposing fibrous layers according to another embodiment of the present invention.

Optionally, the additional layer comprises one or more unidirectional prepregs 21, as shown in FIG. 9. Typically, the additional layer comprises more than one unidirectional prepreg, wherein each unidirectional prepreg comprises fibres aligned unidirectionally, and wherein the fibre alignments of the more than one prepregs are staggered.

The additional layer may be positioned in the composite material as a central layer such that the composite material layers are symmetrical about the central layer/mid-plane of the composite material. This arrangement can be seen, for example, in FIGS. 7 and 9. In this regard, as the surface layer is lighter and the non-woven fibrous layer contributes to the structural strength and stiffness of the composite material, some of the composite material can be replaced with the prepreg of the present invention. As such, it is more economic and weight saving to produce a symmetrical laminate where the prepreg is used on both the A- and B-surface of the composite material, and optionally within the composite material, to provide a symmetrical composite material structure. This is an advantage of a material such as the asymmetric carbon-glass Gurit CBS®, which contains more residual stress from the thicker surfacing layers and can respond to loads asymmetrically.

In another aspect, the present invention relates to a vehicle body panel, optionally an automotive body panel, comprising the composite material as defined herein above.

The present invention is further illustrated with reference to the following non-limiting Examples.

EXAMPLES

Gurit ST160 prepreg resin film was used to produce different laminate panels. The prepreg resin contains a blend of epoxide functional resins and latent curing agents to provide a Tonset of 138-144° C. and a heat of reaction between 360-440 J/g, measured using Differential Scanning Calorimetry (TA Instruments Q20 or Mettler Toledo DSC 12e) using a ramp from 25° C. to 260° C. at 10° C./min. In its uncured state, this resin typically has a minimum viscosity of 4 to 12 poise at 113° C., when measured using a TA Instrument AR2000 Rheometer fitted with disposable 25 mm diameter aluminium plates to run an oscillation experiment from 30-130° C. at 2° C./min using a displacement of $1 \times 10^{-4}$ rads and a frequency of 1 Hz. When cured at 15 minutes at 155° C. ST160 resin would on average give a dry Tg of 160-170° C. obtained after press curing a reference laminate containing 200 gsm of woven carbon fibre when testing with a Dynamic Mechanical Analysis (TA Instruments Q800) in dual cantilever mode using a heat ramp from 30° C. to 200° C. at 3° C./min applying a frequency of 1 Hz.

To produce the surfacing resin, different loadings of Magil Star 350# talc filler was dispersed into the prepreg resin. The filler had an average particle size of 12 microns and produced to give a particle size distribution (measured using a Malvern 3801 Mastersizer particle size analyser) of 99 wt % less than 75 microns, 84 wt % less than 30 microns, 68 wt % less than 20 microns and 48 wt % less than 10 microns. Such a talc filler is available by Richard Baker Harrison.

To produce the syntactic prepreg, K20 glass microspheres from 3M were dispersed into the prepreg resin to lower the density to 850 g/L.

Plies of Gurit 245 gsm woven carbon prepreg PA13-6210 SE160/RC245T/1250/42%/POPA and 300 gsm multi-axial biax prepreg SA23-6436 ST160/XC300C/1270/51%/S/S POPA were used to test more structural laminates using the same base ST160 epoxy prepreg resin as the surfacing and syntactic layers. These materials mainly increase the in-plane strength and stiffness.

Each part was compression moulded by an isothermal hot in-hot out process with the tool temperature measured to be within 150-160° C. The material was loaded into the hot tool and partially shut to engage a vacuum chamber seal. A vacuum was applied before applying pressure to the material to remove any entrapped air. After a full vacuum had been achieved the tool was slowly closed. The load was then increased in a smooth manner to ensure that the tool had shut within 90 seconds of applying the material charge to the hot tool.

The surface quality was visually assessed for painting suitability, using the following two process:
1) Low surface preparation:
   (a) clean panel using DuPont Axalta 3608s;
   (b) abrade with red scotch until surface matt finish was obtained;
   (c) clean panel using DuPont Axalta 3608s;
   (d) spray-apply two coats of Dupont DP 5150 primer, allowing 15 minutes flash off period between the first and second coat to give an approximately 100 micron finished coating weight; and
   (e) Allow 30 min from the final coat prior to baking the paint for 30 min at 50° C.
2) High surface preparation:
   (a) clean panel using DuPont Axalta 3608s;
   (b) Abrade surface with 180 grit and ending with 320 grit abrasive to remove any visible fibre print in the surface
   (c) Clean with clean compressed air to remove any surface dust
   (d) Abrade with red scotch until consistent all over matt finish obtained
   (e) clean panel using DuPont Axalta 3608s;
   (f) spray-apply two coats of Dupont DP 5150 primer, allowing 15 minutes per pass;
   (g) flash off period between the first and second coat to give an approximately 100 micron finished coating weight; and
   (h) Allow 30 min from the final coat prior to baking the paint for 30 min at 50° C. cure the paint primer and assess the surface finish Flexural rigidity was assessed by testing the flexural properties in roll direction of the prepreg in accordance with ISO 14125 Fibre Reinforced Plastic Composites 3-Point Bend Determination of Flexural Properties. A comparison to steel flexural rigidity was made by comparing the EI of the panel, giving the relationship that the same stiffness would be obtained in a first material of modulus $E_1$ and thickness $t_1$ as that of a second material having a modulus $E_2$ and thickness $t_2$ if the following equation is met:

$$E_2 t_2^3 = E_1 t_1^3$$

For this purpose, steel panels were assumed to have a modulus of 200 GPa and a density of 7800 Kg/m$^3$.

Compaction of the fibrous layer was measured using a Zwick Mechanical Testing machine. Three plies of 100×100 mm dry fibrous material were compressed between two 80 mm cylinders. The vertical displacement was first zeroed by closing the cylinders with no material present. The cylinders were then opened and the material placed between. The cylinders were then closed and the point of first contact noted. Further force was applied to measure the thickness of the material stack vs. the applied pressure. The average ply thickness from 5 different test specimens was used.

Three different non-woven fibre materials were used as shown in Table 1, below.

| Material | Description | Initial Thickness/mm | Thickness @ 1 bar/mm | % Of starting thickness | % Compaction |
|---|---|---|---|---|---|
| A | 211 gsm Non Woven needled multi-layered carbon. Mixed fibre 10 to 150 mm | 4.1 | 0.75 | 43% | 57% |
| B | 196 gsm Non Woven needled multi-layered carbon Mixed fibre 10 to 150 mm | 4.0 | 0.74 | 19% | 82% |
| C | 245 gsm Non Woven needled multi-layered carbon 25 mm chopped fibre | 6.0 | 1.15 | 19% | 81% |

Example 1

A preform was manufactured and press-cured. The preform consisted of 3 plies of prepreg material:
1. a prepreg containing a 180 micron surface resin layer weighing 290 gsm and containing 38% pbw (22% by vol) particulate filler in contact with the fibrous layer of material B. The resin side was orientated towards the A-surface of the tool;
2. a syntactic prepreg layer of 800 gsm; and
3. The same prepreg as ply 1 but with the resin side was orientated toward the B-surface of the tool.

The panel had a measured cured ply thickness of 1.29 mm and weight of 1.63 Kg/m after the resin bleed-out from processing. The panel had a flexural modulus of 23.2 GPa and a flexural strength of 437.40 MPa. The panel had the equivalent stiffness of a 0.63 mm steel plate weighing 5.01 Kg/m$^2$, giving a 67% weight saving.

Figure 10:
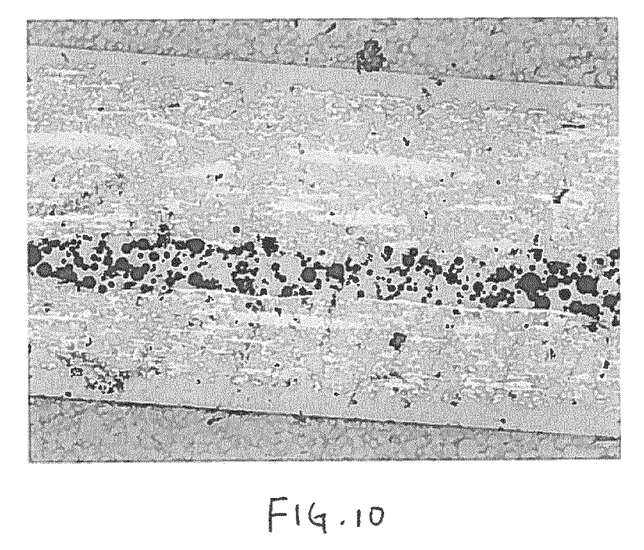
FIG. 10 is a microscope image showing a cross-section of laminate formed as per Example 1.

The panel had a good surface finish. It was prepared for paint using the low surface preparation method and assessed to have an acceptable finish to topcoat for an A-class panel. FIG. 10 shows a micrograph of this laminate. The remaining surface film thickness was on average measured to now be 85 microns. With the flow of resin into the fibrous layer it was estimated at the new surface thickness of 85 microns could now contain up to 51% particulate by volume.

Example 2

A preform was manufactured and press-cured. The preform consisted of 4 plies of prepreg material:
1. a prepreg containing a 282 micron surface resin layer weighing 452 gsm and containing 38% pbw (22% by vol) particulate filler in contact with the fibrous layer of material B. The resin side was orientated towards the A-surface of the tool;
2. a prepreg formed of from cast films of ST160 prepreg resin in contact with the fibrous layer of material B to give a prepreg containing 300 gsm resin film containing no particulate filler;
3. the same prepreg as ply 2
4. the same prepreg as ply 1 but with the resin side orientated toward the B-surface of the tool.

The panel had a good surface finish. It was prepared for paint using the low surface preparation method and assessed to have an acceptable finish to topcoat for an A-class panel.

Example 3

A preform was manufactured and press-cured. The preform consisted of 4 plies of prepreg material:
1. a prepreg containing a 282 micron surface resin layer weighing 452 gsm and containing 38% pbw (22% by vol) particulate filler in contact with the fibrous layer of material B. The resin side was orientated towards the A-surface of the tool;
2. a prepreg formed of from cast films of ST160 prepreg resin in contact with the fibrous layer of material B to give a prepreg containing 450 gsm resin film containing no particulate filler;
3. the same prepreg as ply 2;
4. the same prepreg as ply 1 but with the resin side orientated toward the B-surface of the tool.

The panel had a good surface finish. It was prepared for paint using the low surface preparation method and assessed to have an acceptable finish to topcoat for an A-class panel.

Example 4

A preform was manufactured and press-cured. The preform consisted of 3 plies of prepreg material;
1. a prepreg containing a 528 micron surface resin layer weighing 688 gsm and containing 15% pbw (8% by vol) particulate filler in contact with the fibrous layer of material A. The resin side was orientated towards the A-surface of the tool;
2. one ply of 300 gsm biaxial prepreg Gurit SA23-6436 ST160/XC300C/1270/51%/S/S POPA;
3. the same prepreg as ply 1 but with the resin side orientated toward the B-surface of the tool.

The panel had a good surface finish. It was prepared for paint using the low surface preparation method and assessed to have an acceptable finish to topcoat for an A-class panel.

The panel had a measured cured ply thickness of 1.39 mm and weight of 2.08 Kg/m$^2$ after the resin bleed-out from processing. The panel had a flexural modulus of 17.11 GPa and a flexural strength of 312.9 MPa. The panel had the equivalent stiffness of a 0.61 mm steel plate giving a 56.5% weight saving Example 5

A preform was manufactured and press-cured. The preform consisted of 3 plies of prepreg material:
1. a prepreg containing a 528 micron surface resin layer weighing 688 gsm and containing 15% pbw (8% by vol) particulate filler in contact with the fibrous layer of material C. The resin side was orientated towards the A-surface of the tool;
2. one ply of 300 gsm biaxial prepreg Gurit SA23-6436 ST160/XC300C/1270/51%/S/S POPA;
3. the same prepreg as ply 1 but with the resin side orientated toward the B-surface of the tool.

The panel had a good surface finish. It was prepared for paint using the low surface preparation method and assessed to have an acceptable finish to topcoat for an A-class panel The panel had a measured cured ply thickness of 1.51 mm and weight of 2.32 Kg/m$^2$ after the resin bleed-out from processing. The panel had a flexural modulus of 18.3 GPa and a flexural strength of 267 MPa. The panel had the equivalent stiffness of a 0.68 mm steel plate giving a 56.3% weight saving Example 6

A preform was manufactured and press-cured. The preform consisted of 3 plies of prepreg material:
1. a prepreg containing a 528 micron surface resin layer weighing 688 gsm and containing 15% pbw (8% by vol) particulate filler in contact with the fibrous layer of material A. The resin side was orientated towards the A-surface of the tool;
2. one ply of 0/90 3K 2×2 twill weave 245 gsm carbon prepreg Gurit SE160/RC245T/1250/42%/POPA;
3. the same prepreg as ply 1 but with the resin side orientated toward the B-surface of the tool.

The panel had a good surface finish. It was prepared for paint using the low surface preparation method and assessed to have an acceptable finish to topcoat for an A-class panel.

Example 7

A preform was manufactured and press-cured. The preform consisted of 3 plies of prepreg material:
1. a prepreg containing a 528 micron surface resin layer weighing 688 gsm and containing 15% pbw (8% by vol) particulate filler in contact with the fibrous layer of material A. The resin side was orientated towards the A-surface of the tool;
2. a prepreg formed of from cast films of ST160 prepreg resin in contact with the fibrous layer of material A to give a prepreg containing 400 gsm resin film containing no particulate filler;
3. The same prepreg as ply 1 but with the resin side orientated toward the B-surface of the tool.

The panel had a good surface finish. It was prepared for paint using the low surface treatment method and assessed to have an acceptable finish to topcoat for an A-class panel.

The panel had a measured cured ply thickness of 1.73 mm and weight of 2.54 Kg/m$^2$ after the resin bleed-out from processing. The panel had a flexural modulus of 18.5 GPa and a flexural strength of 313 MPa. The panel had the equivalent stiffness of a 0.78 mm steel plate giving a 58.3% weight saving Comparative Example 1

A preform was manufactured and press-cured. The preform consisted of 3 plies of prepreg material:
1. a prepreg containing a 242 micron surface resin layer weighing 290 gsm and containing no particulate filler in contact with the fibrous layer of material B. The resin side was orientated towards the A-surface of the tool;
2. a syntactic prepreg layer of 800 gsm; and
3. the same prepreg as ply 1 but with the resin side was orientated toward the B-surface of the tool.

The panel had a measured cured ply thickness of 1.31 mm and weight of 1.70 Kg/m$^2$ after the resin bleed-out from processing. The panel had a flexural modulus of 23.6 GPa and a flexural strength of 440 MPa. The panel had the equivalent stiffness of a 0.64 mm steel plate weighing 5.14 Kg/m$^2$, giving a 67% weight saving.

The panel had visible pin holes in the surface. It was prepared for paint using the low surface preparation method and assessed to have an unacceptable topcoat finish for an A-class panel.

Figure 11:
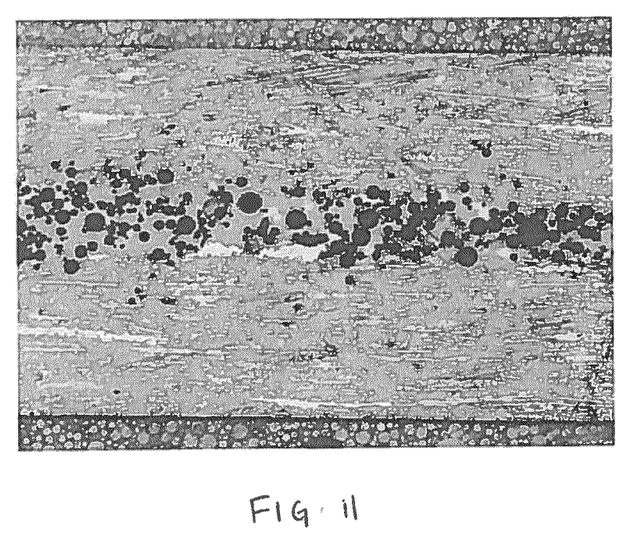
FIG. 11 is a microscope image showing a cross-section of laminate formed as per Comparative Example 1

FIG. 11 shows a micrograph of this laminate. There is an absence of a surface layer with fibres close to the surface. Small pits can also be seen in the resin surface Comparative Example 2

Gurit epoxy prepreg CBS® was used with a 0.7 mm core known to matching the flexural rigidity of a 0.7 mm steel panel.

The material was cured at 120° C. for 30 min using a vacuum bag consolidation on a steel tool. A lightweight 35 gsm polyester scrim (R114-001 RP35/1310 W3139/1310 PLAIN P.E. 35 gsm from Gurit) was first applied to the A surface of the SF96 to act as an air path to remove any trapped voids between the mould surface and prepreg during cure.

SA11-4417 SF96/S/700/1260 mm=Surface film
SA13-2102 ST86EC/RC200T/1270/42%/1PA/L=200 gsm woven carbon
S0A0-2448 SY110/00/560 g-0.7 mm/1270 mm=0.7 mm thick syntactic core
SA11-4800 ST86HT/RE400T/289 gm/S/S prepreg=thermal balancing 400 gsm glass fibre layer After cure, the weight was 2.38 Kg/m$^2$. The equivalent steel weight is 5.46 Kg/m$^2$, giving a 56% weight saving.

The panel had a good surface finish but with some fibre print. It was prepared for paint using the high surface preparation method as the low surface preparation method was not sufficient to prepare the panel for an A-class paint finish. After priming it was and assessed to have an acceptable finish to topcoat for an A-class panel.

Comparative Example 3

Gurit epoxy prepreg CBS® was used with a 1.0 mm core known to matching the flexural rigidity of a 0.8 mm steel panel.

The material was cured at 120° C. for 30 min using a vacuum bag consolidation on a steel tool. A lightweight 35 gsm polyester scrim (R114-001 RP35/1310 W3139/1310 PLAIN P.E. 35 gsm from Gurit) was first applied to the A surface of the SF96 to act as an air path to remove any trapped voids between the mould surface and prepreg during cure.

SA11-4417 SF96/S/700/1260 mm=surface film
SA13-2102 ST86EC/RC200T/1270/42%/1PA/L=200 gsm woven carbon
S0A0-2442 SY110/00/800 g-1.0 mm/1270 mm=0.7 mm thick syntactic core
SA11-4800 ST86HT/RE400T/289 gm/S/S prepreg After cure, the weight was 2.60 Kg/m$^2$. The equivalent steel weight is 6.24 Kg/m$^2$, giving a 58% weight saving.

The panel had a good surface finish but with some fibre print. It was prepared for paint using the high surface preparation method as the low surface preparation method was not sufficient to prepare the panel for an A-class paint finish. After priming it was and assessed to have an acceptable finish to topcoat for an A-class panel

The invention claimed is:
1. A method for preparing a fibre reinforced resin matrix composite material, the method comprising the steps of:
  (i) providing a prepreg comprising:
    a surface film comprising a thermosetting resin and a particulate filler material dispersed therein; and
    a fibrous layer on which the surface film is disposed, the fibrous layer comprising a plurality of non-woven carbon fibres which are substantially ran- domly oriented, wherein the fibrous layer has interstices between the carbon fibres dimensioned for absorbing at least a portion of the thermosetting resin during a resin infusion step and filtering at least a portion of the particulate filler material in the surface film to remain in the surface film during the resin infusion step;

(ii) providing a mould;

(iii) loading the prepreg into a cavity of the mould such that the surface film is located against a moulding surface of the mould; and (iv) subjecting the prepreg to a moulding step, the moulding step comprising applying a vacuum to the cavity of the mould and applying a closure load to the mould to generate a pressure in the cavity of the mould to cause at least a portion of the thermosetting resin to infuse into the fibrous layer to impregnate the carbon fibres and to filter at least a portion of the particulate filler material in the surface film to remain in the surface film, the surface film forming a moulded surface of the fibre reinforced resin matrix composite material;

wherein the surface film in the prepreg has a thickness of from 150-600 microns and a particulate filler concentration of from 2 to 40 vol %, and wherein after the moulding step the surface film of the fibre reinforced resin matrix composite material has a thickness of from 25-400 microns and a particulate filler concentration of from 10 to 70 vol %.

2. The method according to claim 1, wherein during the moulding step the fibrous layer has a loft such that when the fibrous layer is a subjected to a compressive load of 1 bar at 18-23° C. the thickness of the fibrous layer is reduced by at least 30%.

3. The method according to claim 1, wherein during the moulding step the fibrous layer absorbs at least 25 vol % of the thermosetting resin.

4. The method according to claim 1, wherein during the moulding step the fibrous layer filters at least 10 vol % of the particulate filler material in the surface film to remain in the surface film.

5. The method according to claim 1, wherein the fibrous layer in the prepreg comprises needle holes, and wherein the needle holes are at least partially filled with the particulate filler material during the moulding step.

6. The method according to claim 1, wherein the prepreg in step (i) comprises a plurality of the surface films and at least one of the fibrous layers to form a multilayer prepreg, wherein the at least one fibrous layer is sandwiched between opposing surface films, and wherein during the moulding step at least a portion of the thermosetting resin from each of the opposing surface films infuses into the at least one fibrous layer to impregnate the carbon fibres.

7. The method according to claim 1, wherein the prepreg in step (i) comprises at least two of the fibrous layers and further comprises at least one additional layer sandwiched between opposing fibrous layers.

8. The method according to claim 7, wherein the additional layer comprises a syntactic layer, wherein the syntactic layer comprises a resin and hollow microspheres dispersed therein.

9. The method according to claim 8, wherein during the moulding step at least a portion of thermosetting resin from the syntactic layer infuses into each of the fibrous layers to impregnate the carbon fibres.

10. The method according to claim 7, wherein the additional layer comprises a resin.

11. The prepreg according to claim 7, wherein the additional layer comprises more than one unidirectional prepreg, wherein each unidirectional prepreg comprises fibres aligned unidirectionally, and wherein the fibre alignments of the more than one prepregs are staggered with respect to each other.

12. The method according to claim 7, wherein the additional layer is a central layer of the composite material and the composite material layers are symmetrical about the central layer.

13. The method according to claim 1, wherein the moulding step is conducted at a pressure of from 6 to 50 bar.

14. The method according to claim 1, wherein the moulding step is conducted at a temperature of from 80 to 250° C.

15. The method according to claim 1, wherein the fibrous layer comprises chopped and/or cut fibres.

16. The method according to claim 1, wherein fibre reinforced resin matrix composite material is a vehicle body panel.

17. A method for preparing a fibre reinforced resin matrix composite material, the method comprising the steps of:

(i) providing a prepreg, the prepreg comprising:
   a surface film comprising a thermosetting resin and a particulate filler material dispersed therein, wherein the surface film has a thickness of from 150 to 600 microns, the surface film has a particulate filler material concentration of from 2 to 40 vol % based on the volume of the surface film, the particulate filler material comprises Talc, calcium carbonate, silica, alumino-silicate ash, chalk, clay minerals, marble dust, slate powder or silicon carbide, and the particulate filler material has an average particle size of from 5 to 30 microns; and
   a fibrous layer on which the surface film is disposed, the fibrous layer comprising a plurality of nonwoven carbon fibres which are substantially randomly oriented, wherein the fibrous layer comprises chopped and/or cut fibres;
wherein the fibrous layer has interstices between the carbon fibres dimensioned for absorbing at least a portion of the thermosetting resin during a resin infusion step and filtering at least a portion of the particulate filler material in the surface film to remain in the surface film during the resin infusion step;

(ii) providing a heated premould;

(iii) loading the prepreg into the premould;

(iv) subjecting the prepreg to a temperature of from 0 to 150° C. and/or a pressure of from 0.01 to 10 bar so as to increase rigidity of the prepreg and form a preform;

(v) providing a mould;

(vi) loading the preform into a cavity of the mould such that the surface film is located against a moulding surface of the mould; and (vii) subjecting the preform to a moulding step, the moulding step comprising applying a vacuum to the cavity of the mould and applying a closure load to the mould to generate a pressure in the cavity of the mould to cause at least a portion of the thermosetting resin to infuse into the fibrous layer to impregnate the carbon fibres and to filter at least a portion of the particulate filler material in the surface film to remain in the surface film, the surface film forming a moulded surface of the fibre reinforced resin matrix composite material.

18. The method according to claim 1, A method for preparing a fibre reinforced resin matrix composite material, the method comprising the steps of: (i) providing a prepreg comprising: a surface film comprising a thermosetting resin and a particulate filler material dispersed therein; and a fibrous layer on which the surface film is disposed, the fibrous layer comprising a plurality of non-woven carbon fibres which are substantially randomly oriented, wherein the fibrous layer has interstices between the carbon fibres dimensioned for absorbing at least a portion of the thermosetting resin during a resin infusion step and filtering at least a portion of the particulate filler material in the surface film to remain in the surface film during the resin infusion step; (ii) providing a mould; (iii) loading the prepreg into a cavity of the mould such that the surface film is located against a moulding surface of the mould; and (iv) subjecting the prepreg to a moulding step, the moulding step comprising applying a vacuum to the cavity of the mould and applying a closure load to the mould to generate a pressure in the cavity of the mould to cause at least a portion of the thermosetting resin to infuse into the fibrous layer to impregnate the carbon fibres and to filter at least a portion of the particulate filler material in the surface film to remain in the surface film, the surface film forming a moulded surface of the fibre reinforced resin matrix composite material wherein in the prepreg the surface film has a thickness of from 150 to 600 microns, the surface film has a particulate filler material concentration of from 2 to 40 vol % based on the volume of the surface film, the particulate filler material comprises Talc, calcium carbonate, silica, alumino-silicate ash, chalk, clay minerals, marble dust, slate powder or silicon carbide, and the particulate filler material has an average particle size of from 5 to 30 microns.

\* \* \* \* \*

UNITED STATES PATENT AND TRADEMARK OFFICE
CERTIFICATE OF CORRECTION

Page 1 of 1

PATENT NO. : 10,870,240 B2
APPLICATION NO. : 15/556493
DATED : December 22, 2020
INVENTOR(S) : Daniel Thomas Jones It is certified that error appears in the above-identified patent and that said Letters Patent is hereby corrected as shown below:

In the Claims

Column 20, Lines 65-66 (Claim 18) delete ". A method"

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*